US012121950B2

(12) United States Patent
Shi et al.

(10) Patent No.: US 12,121,950 B2
(45) Date of Patent: Oct. 22, 2024

(54) CONDUCTIVE POST-FURNACE HEATING OF SHEET FOR HOT FORMING

(71) Applicant: MAGNA INTERNATIONAL INC., Aurora (CA)

(72) Inventors: Cangji Shi, Vaughan (CA); Eric Denijs, Toronto (CA); Pascal Charest, Caledon East (CA)

(73) Assignee: MAGNA INTERNATIONAL, INC., Aurora (CA)

(*) Notice: Subject to any disclaimer, the term of this patent is extended or adjusted under 35 U.S.C. 154(b) by 199 days.

(21) Appl. No.: 17/594,664

(22) PCT Filed: May 6, 2020

(86) PCT No.: PCT/IB2020/054291
§ 371 (c)(1),
(2) Date: Oct. 25, 2021

(87) PCT Pub. No.: WO2020/225749
PCT Pub. Date: Nov. 12, 2020

(65) Prior Publication Data
US 2022/0176434 A1    Jun. 9, 2022

Related U.S. Application Data

(60) Provisional application No. 62/843,614, filed on May 6, 2019.

(51) Int. Cl.
*C21D 1/25* (2006.01)
*B21D 22/02* (2006.01)
(Continued)

(52) U.S. Cl.
CPC .............. *B21D 22/022* (2013.01); *C21D 1/25* (2013.01); *C21D 1/42* (2013.01); *C21D 1/673* (2013.01);
(Continued)

(58) Field of Classification Search
CPC .......... B21D 22/022; C21D 1/25; C21D 1/42; C21D 1/673; C21D 7/13; C21D 8/0421;
(Continued)

(56) References Cited

U.S. PATENT DOCUMENTS

2014/0124104 A1* 5/2014 Trippe .................... C22C 38/44
                                                                 72/342.7

FOREIGN PATENT DOCUMENTS

WO       2010/127837       11/2010
WO    WO-2010127837 A2 *  11/2010   ............. B21D 37/16
WO       2019/213774       11/2019

OTHER PUBLICATIONS

International Preliminary Report on Patentability dated Nov. 18, 2021, issued in the corresponding International Application No. PCT/IB2020/054291 filed May 6, 2020, pp. 1-7.
(Continued)

*Primary Examiner* — Rebecca Janssen
(74) *Attorney, Agent, or Firm* — Pillsbury Winthrop Shaw Pittman, LLP

(57) ABSTRACT

A system for producing components by hot forming includes a conductive post-furnace heat station, a furnace, a computer system, and a press. The computer system comprises one or more physical processors operatively connected with the furnace in and the conductive post-furnace heat station. The one or more physical processors being programmed with computer program instructions which, when executed cause the computer system to control the furnace to heat the blank to a temperature that is below AC3 temperature; and control the conductive post-furnace heat station to heat a portion of the heated blank to a temperature above the AC3 temperature by thermal conduction. The press is constructed and
(Continued)

arranged to receive the post-heated blank from the post-furnace heat station and to form the post-heated blank into the shape of the component.

20 Claims, 11 Drawing Sheets

(51) Int. Cl.
    *C21D 1/42*     (2006.01)
    *C21D 1/673*     (2006.01)
    *C21D 7/13*     (2006.01)
    *C21D 8/04*     (2006.01)
    *C21D 9/48*     (2006.01)
    *C21D 11/00*     (2006.01)

(52) U.S. Cl.
    CPC .............. *C21D 7/13* (2013.01); *C21D 8/0421* (2013.01); *C21D 8/0447* (2013.01); *C21D 9/48* (2013.01); *C21D 11/00* (2013.01)

(58) Field of Classification Search
    CPC ........ C21D 8/0447; C21D 9/48; C21D 11/00; C21D 2221/00; Y02P 10/25
    See application file for complete search history.

(56) References Cited

OTHER PUBLICATIONS

International Search Report and Written Opinion issued in corresponding International Patent Application No. PCT/IB2020/054291, dated Jun. 30, 2020.

\* cited by examiner

Cross-section View

Top View

CONDUCTIVE POST-FURNACE HEATING OF SHEET FOR HOT FORMING

This application is the U.S. National Stage of PCT/IB2020/054291, filed May 6, 2020, which in turn claims the benefit of priority of U.S. Provisional Application No. 62/843,614, filed May 6, 2019. The contents of the foregoing applications are hereby incorporated herein in their entirety by reference.

FIELD

The present patent application relates to a system and a method for producing components by hot forming.

BACKGROUND

Hot forming generally comprises heating a blank in a furnace, followed by stamping the heated blank between a pair of dies to form a shaped part, and quenching the shaped part between the dies. The blank is generally heated in the furnace to achieve an austenitic microstructure, and then quenched in the dies to transform the austenitic microstructure to a martensitic microstructure.

Also, steel continues to be the material of choice when it comes to modern and cost-effective vehicle bodies. In terms of material, new steels that combine high strength with good formability have been developed in response to the demands of the automotive industry for light weight construction materials. In particular, the multiphase steels are used extensively in hot stamping or forming in which a steel blank is heated into the zone of full austenitization (typically 920° C.). The heated steel blank is subsequently inserted into the forming tool or press while still hot, and is rapidly cooled during the pressing operation.

Advantages of the press hardening method include low forming resistance and better formability of steel at this temperature, as well as high strength and good dimensional stability of the obtained component. In general, the use of hot stamping methods and new steel materials results in high-strength but low-weight vehicle bodies.

A steel blank can be hot formed and quenched to create hard zones providing the required strength, and soft zones providing an increased ductility in select areas of the blank. Various tailored tempering properties (TTP) technologies can be used to form the soft zones.

One method to form the soft zones in the steel blank is furnace partial heating. In the furnace partial heating configuration, a furnace is structured with multiple chambers arranged parallel in longitudinal direction. A steel blank is entirely heated above its specific Ac3-temperature in the first chamber. The blank is then transferred to the second chamber and partially cooled below Ac3-temperature using air blow in certain regions where lower strength but higher ductility are required. This furnace partial heating process has longer heating cycle time and the cooling section also requires specialized cartridges.

Another method to form the soft zones in the steel blank is heated die configuration. In the heated die configuration, a quench die is segmented to have some inserts with cooling channels and other inserts of the die are heated to temperatures ranging from 300 C to 600° C. When a steel blank being heated to the austenitization temperature is quenched in such a die, the areas of the steel blank contacting cold inserts form a martensitic structure, while a more ductile microstructure with lower strength, such as bainite and ferrite-pearlite, form in the areas of the steel blank contacting heated inserts. Advantage of this heated die configuration is utilization of heat treatment furnaces used in the conventional hot stamping process. Disadvantages of this heated die configuration are is more complex tool design and faster wear of heated inserts.

Yet another method to form the soft zones in the steel blank is post-form annealing configuration. In the post-form annealing configuration, soft zones in a fully hardened hot stamp part can be obtained by a post-form annealing process using flame, induction or laser. Disadvantage of this post-form annealing configuration includes a risk of part distortion during the local heat treatment and additional process.

Due to the increasing use of hot stamping technology in the automotive industry, the press-hardening machinery is becoming faster. Machines that achieve five strokes per minute have been in use for some time already, and newer machines that achieve seven strokes per minute are known. As a result of the reduced cycle length, the efficiency of the hot stamping method is increased. However, the heating of the supplied blanks via heating furnaces has hitherto been the limiting factor. Since the blanks have to be heated to a processing temperature of over 900° C., heating furnaces that are configured as continuous furnaces are used. Over a 30 meter length of such a continuous furnace, the blank is heated by 30° C. per meter. Accordingly, the pass-through speed of the blanks and the length of the heating furnaces limits the cycle length of the hot stamping system.

The present patent application provides improvements to hot forming/stamping systems and operations.

SUMMARY

One aspect of the present patent application provides a system for producing components by hot forming. The system includes a conductive post-furnace heat station, a furnace, a computer system, and a press. The furnace is constructed and arranged to receive a blank. The conductive post-furnace heat station is constructed and arranged to receive a portion of the heated blank from the furnace. The computer system comprises one or more physical processors operatively connected with the furnace and the conductive post-furnace heat station. The one or more physical processors are programmed with computer program instructions which, when executed cause the computer system to control the furnace to heat the blank to a temperature that is below AC3 temperature; and to control the conductive post-furnace heat station to heat the portion of the heated blank to a temperature above the AC3 temperature by thermal conduction. The press is constructed and arranged to receive the post-heated blank from the post-furnace heat station and to form the post-heated blank into the shape of the component.

Another aspect of the present patent application provides a method for producing components by hot forming. The method is implemented by a computer system, that comprising one or more physical processors executing computer program instructions that, when executed, perform the method. The method comprises heating a blank in a furnace to a temperature that is below AC3 temperature; transferring the heated blank from the furnace to a conductive post-furnace heat station; heating a portion of the heated blank in the conductive post-furnace heat station to a temperature above the AC3 temperature by thermal conduction; transferring the heated blank from the conductive post-furnace heat station to a press; and forming the post-heated blank into the shape of the component in the press.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise.

DETAILED DESCRIPTION OF THE DRAWINGS

Figure 1:
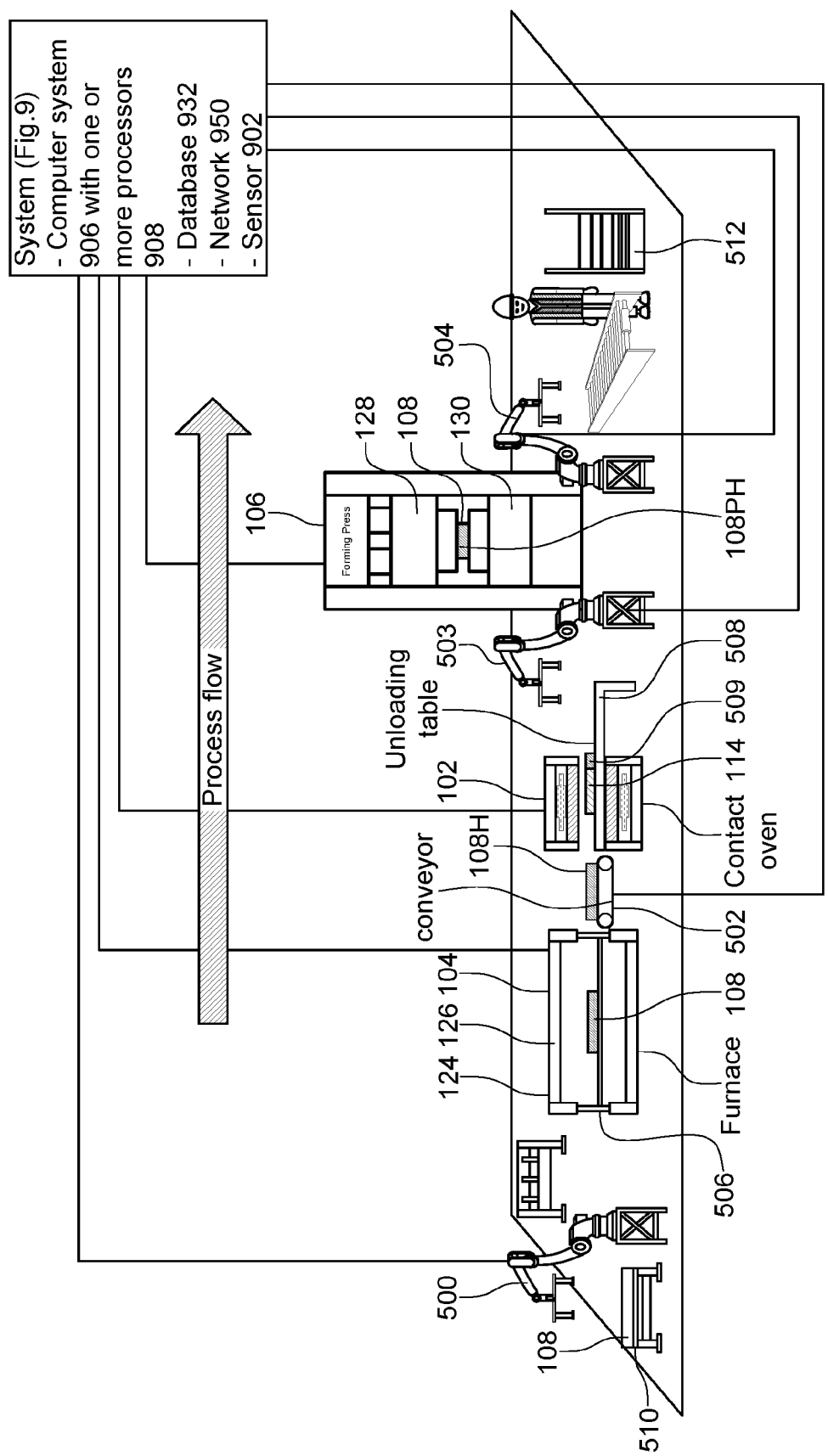
FIG. 1 shows a system for producing components by hot stamping procedure(s) or hot forming procedure(s) in accordance with an embodiment of the present patent application.

Referring to FIGS. 1-7 and 9-10, in one embodiment, a system 100 for producing components by hot forming or hot stamping is provided. In one embodiment, the system 100 includes a conductive post-furnace heat station 102, a furnace 104, a computer system 105 and a press 106. In one embodiment, the furnace 104 is constructed and arranged to receive a blank 108. In one embodiment, the conductive post-furnace heat station 102 is constructed and arranged to receive a portion of the heated blank from the furnace 104. In one embodiment, the computer system 906 comprises one or more physical processors 908 operatively connected with the furnace 104 and the conductive post-furnace heat station 102. In one embodiment, the one or more physical processors 908 of the computer system 906 are programmed with computer program instructions which, when executed cause the computer system 906 to control the furnace 104 to heat the blank 108 to a temperature that is below AC3 temperature, and to control the conductive post-furnace heat station 102 to heat the portion 114 of the heated blank 108H to a temperature above the AC3 temperature by thermal conduction. In one embodiment, the press 106 is constructed and arranged to receive the post-heated blank 108PH from the post-furnace heat station 102 and to form the post-heated blank 108PH into the shape of the component 208. In one embodiment, the press 106 is constructed and arranged to quench the component 208 in the press 106.

In one embodiment, AC3 is the temperature at which transformation of ferrite to austenite is completed during heating.

In one embodiment, the system 100 is configured to provide tailored tempered properties using thermal conduction post-heating (i.e., thermal conduction procedures are performed after the heating procedures in the furnace 104). In one embodiment, the system 100 is configured to partially heat the blank 108 using thermal conduction post-heating so as to achieve tailored tempered properties after quenching procedures in the press 106. In one embodiment, the system 100 is configured to partially post-heat the blank 108 through thermal conduction post-heating to achieve tailored tempered properties after press hardening procedures in the press 106. In one embodiment, the system 100 is configured to use heated platens to conduction heat the blank 108 for the purposes of hot stamping.

In one embodiment, thermal conduction post-heat is a method of transferring energy/heat into the blank 108 using heat/thermal conduction as the mode of heat transfer. In one embodiment, thermal conduction post-heat includes contact heating of the blank 108. In one embodiment, thermal conduction is the most efficient form of heat transfer and provides the least heating time.

In one embodiment, the steel blank 108 is entirely heated up to a temperature below AC3 temperature in the furnace 104. In one embodiment, the blank 108 is then transferred to the conductive post-furnace heat station 102 (e.g., having a set of hot platens) where at least a portion 114 of the blank 108 is thermal conduction heated above AC3 temperature for austenitization transformation. After that, the blank 108 is formed and quenched in the press 106 (e.g., with dies). In one embodiment, referring to FIG. 7, in the formed part or component 208, the furnace only heated portion 210 of the blank 108 has a more ductile microstructure with lower strength, while the portion 214 of the blank 108 that is being conduction heated has a martensitic microstructure with higher strength. Therefore, in one embodiment, conduction post-furnace heating provides an alternative way of achieving tailored tempered property with less heating cycle time, utilization of conventional quench die and higher dimensional accuracy. In one embodiment, thermal conduction post-heat of blank 108 provides a heating solution to reduce overall oven residence time of the blank in the furnace 104.

In one embodiment, the blank 108 used to manufacture the shaped parts or components 208 are typically formed of metal, but can be formed of other materials. In one embodiment, the blank 108 is formed of steel material, such pure steel or a steel alloy.

In one embodiment, the blank 108 includes a base blank and a patch blank attached to the base blank. In one embodiment, the base blank and the patch blank are integrally formed. In one embodiment, the base blank may also be referred to as a parent blank. In one embodiment, the base blank and the patch blank have the same thickness. In another embodiment, the base blank and the patch blank have different thicknesses. In one embodiment, the base blank and the patch blank are made of the same material. In another embodiment, the base blank and the patch blank are made of different materials. In one embodiment, the base blank and the patch blank are made of the same material grade. In another embodiment, the base blank and the patch blank are made of different material grades. In one embodiment, the patch blank has an area smaller than the area of the blank 108. In one embodiment, the patch blank is surrounded by portions (e.g., unpatched or remaining portions) of the base blank. In one embodiment, the portions of the base blank surrounding the patch blank are referred to as non-patched/unpatched portions or the remaining portions of the blank 108. In one embodiment, the patch blank is configured to overlap at least a portion of the base blank. In one embodiment, the patch blank is attached to the base blank by welding, adhesive or mechanical joining operation/procedure. In one embodiment, edge or internal portion of the patch blank is joined to the base blank using resistance spot welding (RSW), metal inert gas welding (MIG), laser welding, friction stir welding, self-piercing rivet (SPR) or flow drill screw (FDS) procedures. In one embodiment, the patch blank may be used to provide local reinforcements (i.e., with improved load transfer and/or distribution of stresses) to the blank 108. In another embodiment, the patch blank is provided where greater strength, stiffness and Noise, vibration and harshness ("NVH") performance are desired.

In one embodiment, the blank 108 is a monolithic blank. In one embodiment, the blank 108 includes a patched region and a non-patched region.

In one embodiment, the blank 108 is a tailor welded blank. In one embodiment, the tailor welded blank is formed by a tailor welded blank procedure. In one embodiment, the tailor welded blank includes blank members that are welded together during the tailor welded blank procedure. In one embodiment, the blank members being welded together during the tailor welded blank procedure may have different strengths and/or different thicknesses.

In one embodiment, the blank 108 is a tailor rolled blank. In one embodiment, the tailor rolled blank is formed by a tailor rolled blank procedure. In one embodiment, the tailor rolled blank includes variable thickness portions.

In one embodiment, the computer system 906 is configured to control the operations of various components (robots, conveyor, furnace, conductive post-furnace heat station, press, other system components, etc.) of the system 100. In one embodiment, the computer system 906 is configured to verify that each component of the system 100 is operating correctly in order to maximize the efficiency. In one embodiment, each of the components (robots, conveyor, furnace, conductive post-furnace heat station, press, other system components, etc.) are controlled independently by their own processors, but the computer system 906 are configured to share signals between the processors of the robots, conveyor, furnace, post-heat station, press, other system components, etc. In one embodiment, the computer system 906 is described in detail below with respect to FIG. 9.

In one embodiment, the system 100 includes one or more robots 500, 503, 504 and conveyor 502 that are operatively connected to the computer system 906. In one embodiment, the number of robots and/or conveyors may vary. In one embodiment, the one or more robots 500, 503, 504 and conveyor 502 may be referred to as transfer stations and will be described in detail below.

In one embodiment, the robot 500 is constructed and arranged to de-stack (i.e., for removing) the topmost (i.e., single) blank 108 from a stack of sheet metal blanks 510 and to automatically dispose the blank 108 in the furnace 104. In one embodiment, the robot 500 is constructed and arranged to lift the blank 108 from the stack of sheet metal blanks 510 and place the blank 108 on a blank loader 506 of the furnace 104.

In one embodiment, the system 100 is constructed and arranged to stamp date and/or bench mark indicia on the blank 108 after the de-stacking the blank 108 and before positioning the blank 108 in the furnace 104.

In another embodiment, the system 100 includes a blank feeder that is disposed between the stack of sheet metal blanks 510 and the furnace 104. In one embodiment, the blank feeder is constructed and arranged to convey the blank 108 from the stack of sheet metal blanks 510 to the furnace 104. That is, the blank feeder is constructed and arranged to extend continuously from the stack of sheet metal blanks 510 to the furnace 104. In one embodiment, the blank feeder is an indexing blank feeder and includes a plurality of driven rollers. In one embodiment, the indexing feature of the blank feeder comprises a plurality of indexing fingers for aligning the blank 108 in a predetermined position prior to entering the furnace 104.

Figure 8:
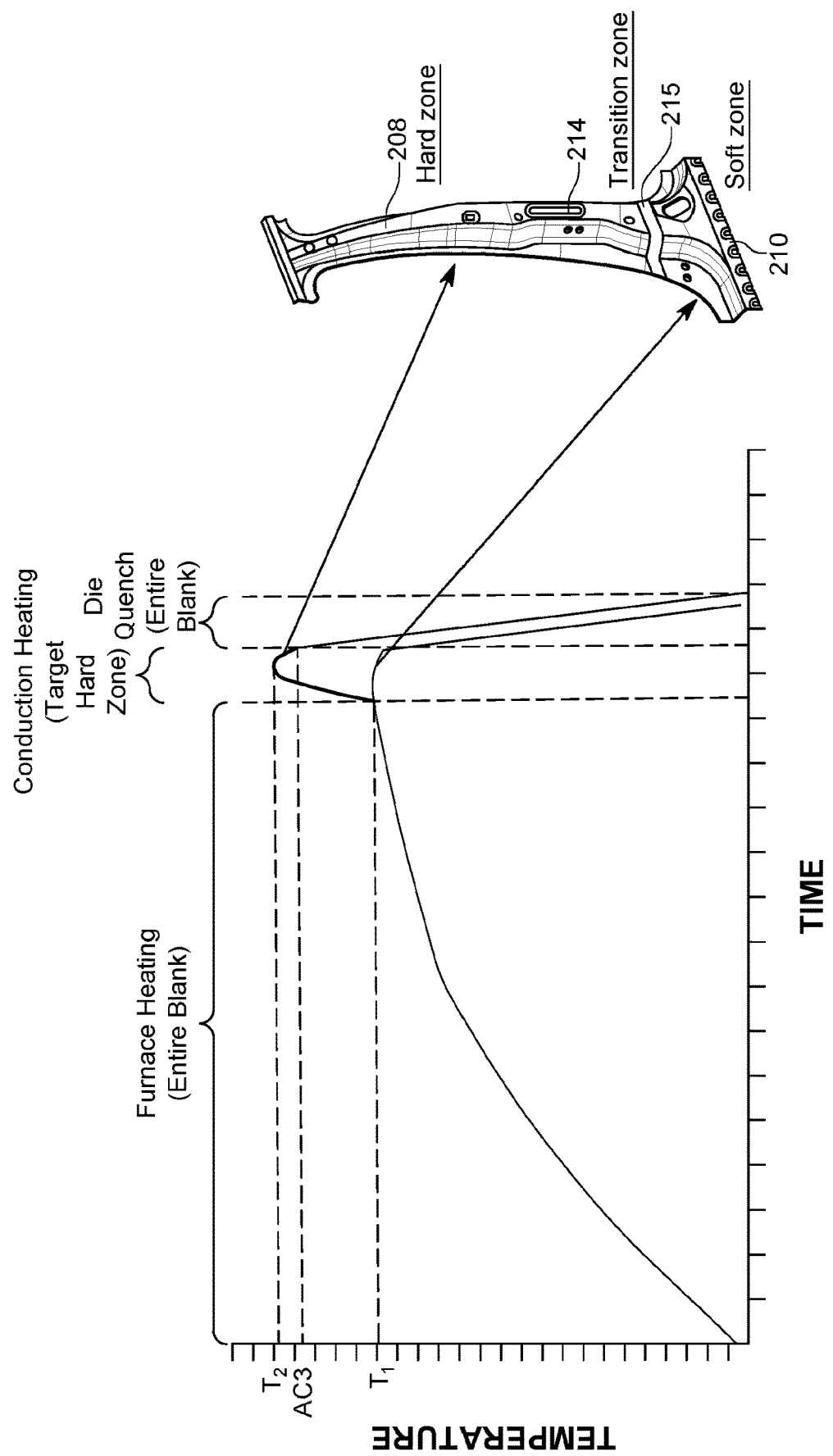
FIG. 8 shows a graphical representation of various temperature profiles of the blank member heated in the system of the present patent application.

In one embodiment, in the furnace 104, the temperature of the entire blank 108 is heated to a temperature T1 (as shown in FIG. 8) that is below the AC3 temperature. In one embodiment, the temperature that is below the AC3 temperature is in the range between room temperature and 912° C.

In one embodiment, the furnace 104 includes a housing 124 and a heating system 126 (e.g., direct or indirect). In one embodiment, the furnace 104 includes a plurality of driven rollers. In one embodiment, the furnace 104 is a continuous furnace. In one embodiment, the furnace 104 is a roller hearth furnace. In one embodiment, the blank 108 is transported through the furnace 104 using rollers. That is, in one embodiment, the plurality of driven rollers are configured to convey the blank 108 through the furnace 104. In one embodiment, the driven rollers comprises mechanically driven (e.g., ceramic material) rollers or rollers of the type used in the hearth type furnaces. In one embodiment, the driven rollers of the furnace 104 are constructed and arranged to rotate continuously, remain stationary for periods of time, or oscillate forward and backward, depending on the amount of heating desired.

In one embodiment, the heating system 126 includes a gas burner, an electric heater, or another type of heater. In one embodiment, the heating system 126 comprises a single heating element or a plurality of heating elements. For example, the heating system 126 includes a plurality of tubes containing burning gas, or a plurality of heated coils.

In one embodiment, the furnace 104 is operatively connected to the computer system 906. In one embodiment, the computer system 906 is configured to determine whether the blank 108, in the furnace 104, has reached a temperature T1 (as shown in FIG. 8) below the AC3 temperature. In one embodiment, this may be determined either with sensors 902 associated with the furnace 104 or by monitoring the amount of time that each blank 108 remains in the furnace 104. In one embodiment, the computer system 906 is also configured to adjust the amount of time that the blank 108 is in the furnace 104. In one embodiment, the computer system 906 is configured to control the furnace 104 to heat the blank 108 to the temperature that is in the range of room temperature and 912° C. and that is below AC3 temperature.

In one embodiment, the system 100 includes conveyor 502 that is constructed and arranged to convey the heated blank 108H from the furnace 104 and place the heated blank 108H in position in the conductive post-furnace heat station 102. In one embodiment, the conveyor 502 may be the first transfer station. In one embodiment, the first transfer station 502 is controlled by the computer system 906 and is configured to transfer the heated blank 108H from the furnace 104 to the conductive post-furnace heat station 102.

In another embodiment, the system 100 includes a robot that is disposed between the furnace 104 and the conductive post-furnace heat station 102 and that is constructed and arranged to transfer the heated blank 108H from the furnace 104 and place the heated blank 108H in position in the conductive post-furnace heat station 102.

In another embodiment, the system 100 includes a blank feeder that is disposed between the furnace 104 and the conductive post-furnace heat station 102 and that is operatively connected to both the furnace 104 and the conductive post-furnace heat station 102. In one embodiment, the blank feeder is constructed and arranged to convey the heated blank 108H from the furnace 104 to the conductive post-furnace heat station 102. That is, the blank feeder is constructed and arranged to extend continuously from the furnace 104 to the conductive post-furnace heat station 102. In one embodiment, the blank feeder is an indexing blank feeder and includes a plurality of driven rollers. In one embodiment, the indexing feature of the blank feeder comprises a plurality of indexing fingers for aligning the heated blank 108 in a predetermined position prior to entering the conductive post-furnace heat station 102. In one embodiment, the blank feeder is insulated from the surrounding environment, or includes a heater (not shown) so that temperature decrease from a temperature T1 (as shown in FIG. 8) below the AC3 temperature of the heated blank 108H can be minimized, when the heated blank 108H enters the conductive post-furnace heat station 102.

In one embodiment, as shown in FIGS. 1-6, the conductive post-furnace heat station 102 includes an induction contact oven. In one embodiment, the conductive post-furnace heat station 102 includes upper and lower contact platens 118 and 120. In one embodiment, the upper and lower platens 118 and 120 are configured to heat only a portion 114 of the heated blank 108H to a temperature above the AC3 temperature by thermal conduction. In one embodiment, the computer system 906 is configured to control the post-furnace heat station 102 to heat the heated blank 108H, by thermal conduction, to the temperature T2 (as shown in FIG. 8) that is in the range of 727 and 1400° C. and that is above AC3 temperature.

In one embodiment, at least one of the upper and lower platens 118 and 120 is a moveable platen. In one embodiment, the conductive post-furnace heat station 102 is operatively connected to the computer system 906. In one embodiment, the computer system 906 is configured to actuate the upper and/or lower platens 118 and 120 (after the heated blank 108H is properly placed between the upper and lower platens 118 and 120) such that the upper platen 118 and the lower platen 120 are brought into contact with each other.

Figure 2:
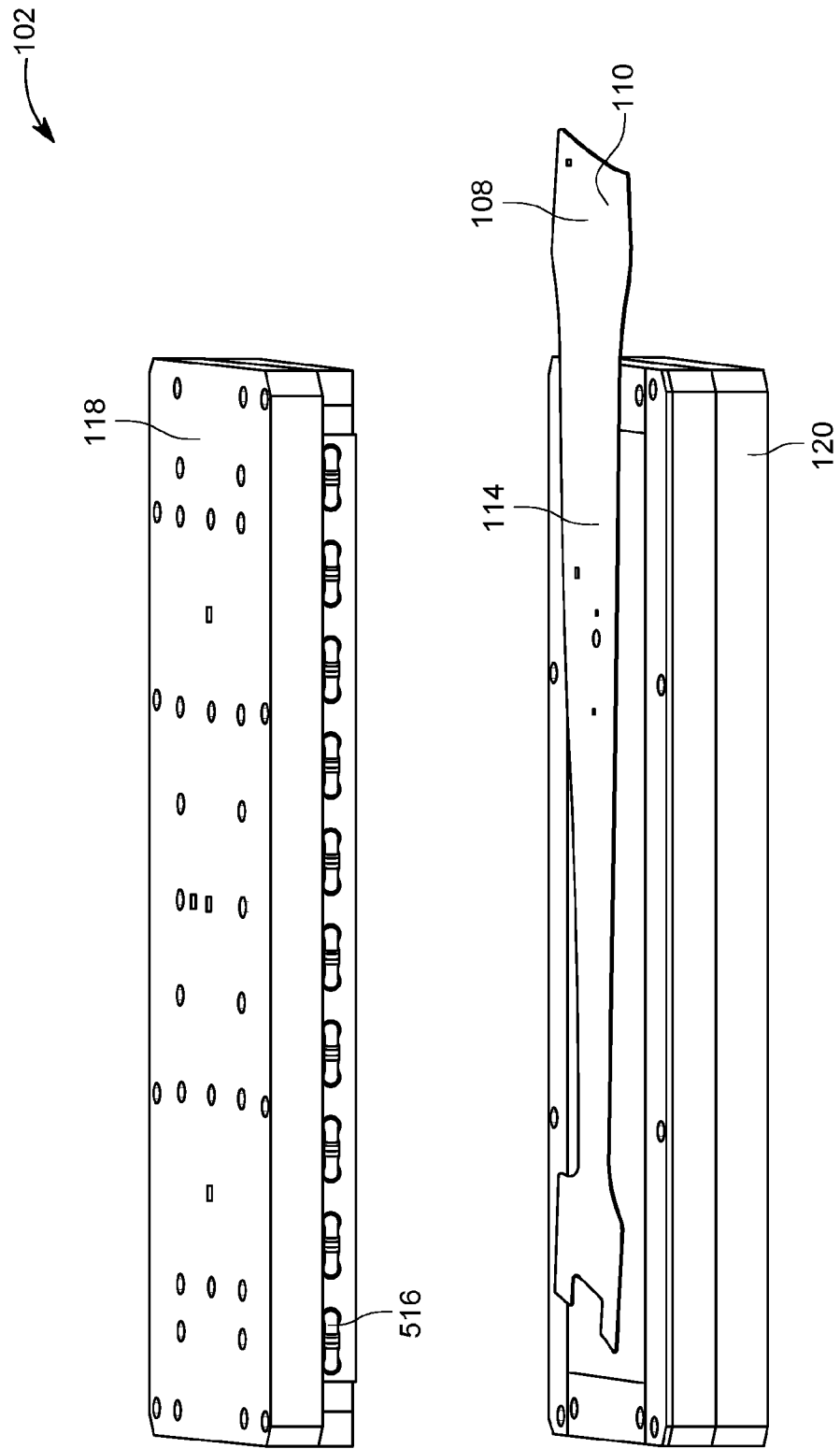
FIGS. 2 and 3 show an exploded view of a conductive post-furnace heat station of the system for producing components by the hot stamping/hot forming procedure(s), wherein some portions of the conductive post-furnace heat station are not shown for sake of clarity and to better illustrate other portions of the conductive post-furnace heat station, in accordance with an embodiment of the present patent application, wherein FIGS. 2 and 3 also show a blank member being received and heated by the conductive post-furnace heat station.
Figure 3:
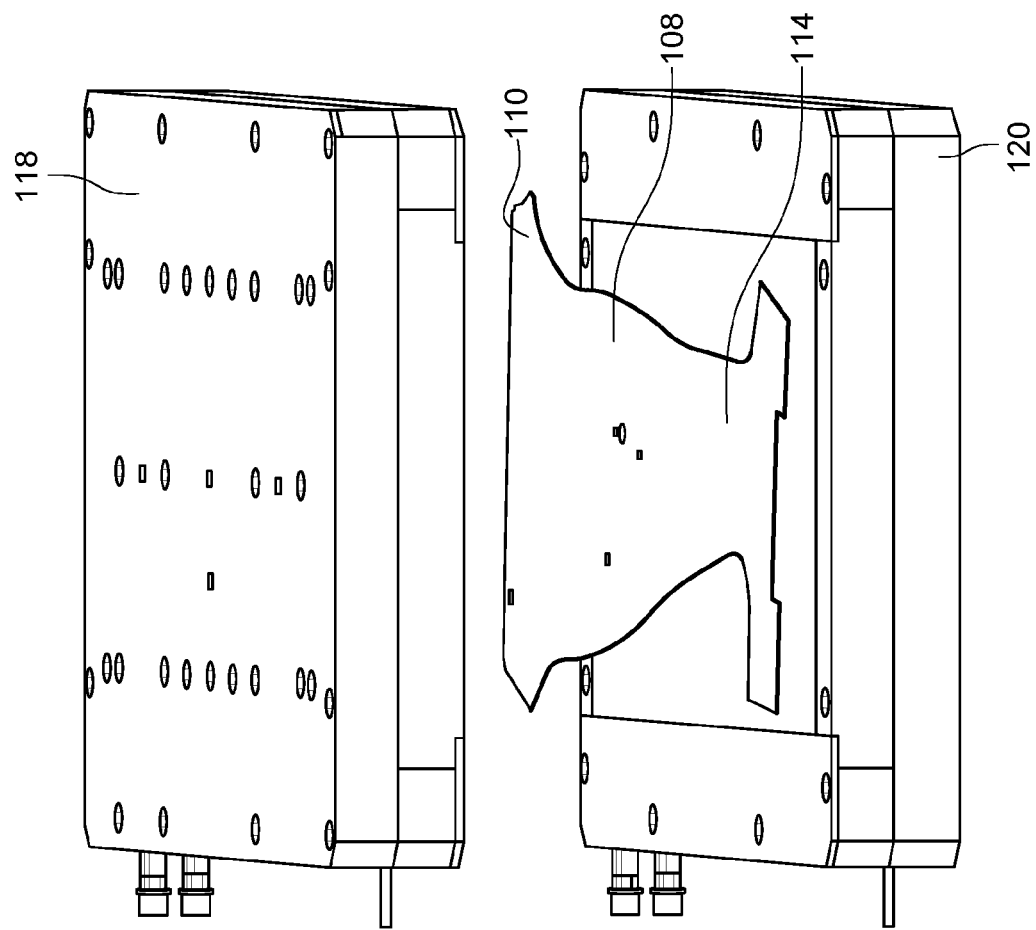
Figure 4:
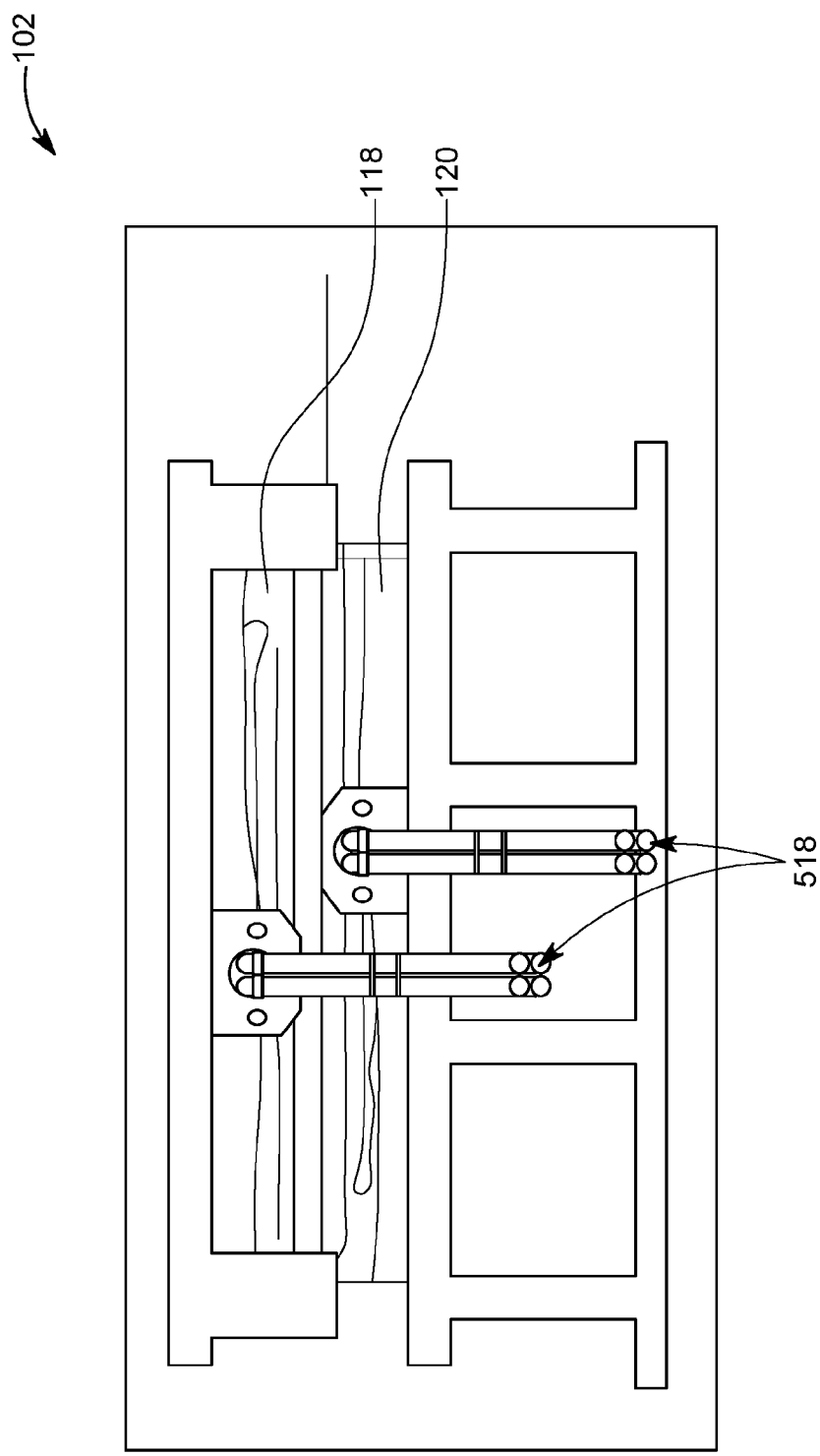
FIG. 4 shows a side view of the conductive post-furnace heat station of the system for producing components by the hot stamping/hot forming procedure(s), wherein some portions of the conductive post-furnace heat station are not shown for sake of clarity and to better illustrate other portions of the conductive post-furnace heat station, in accordance with an embodiment of the present patent application.
Figure 5:
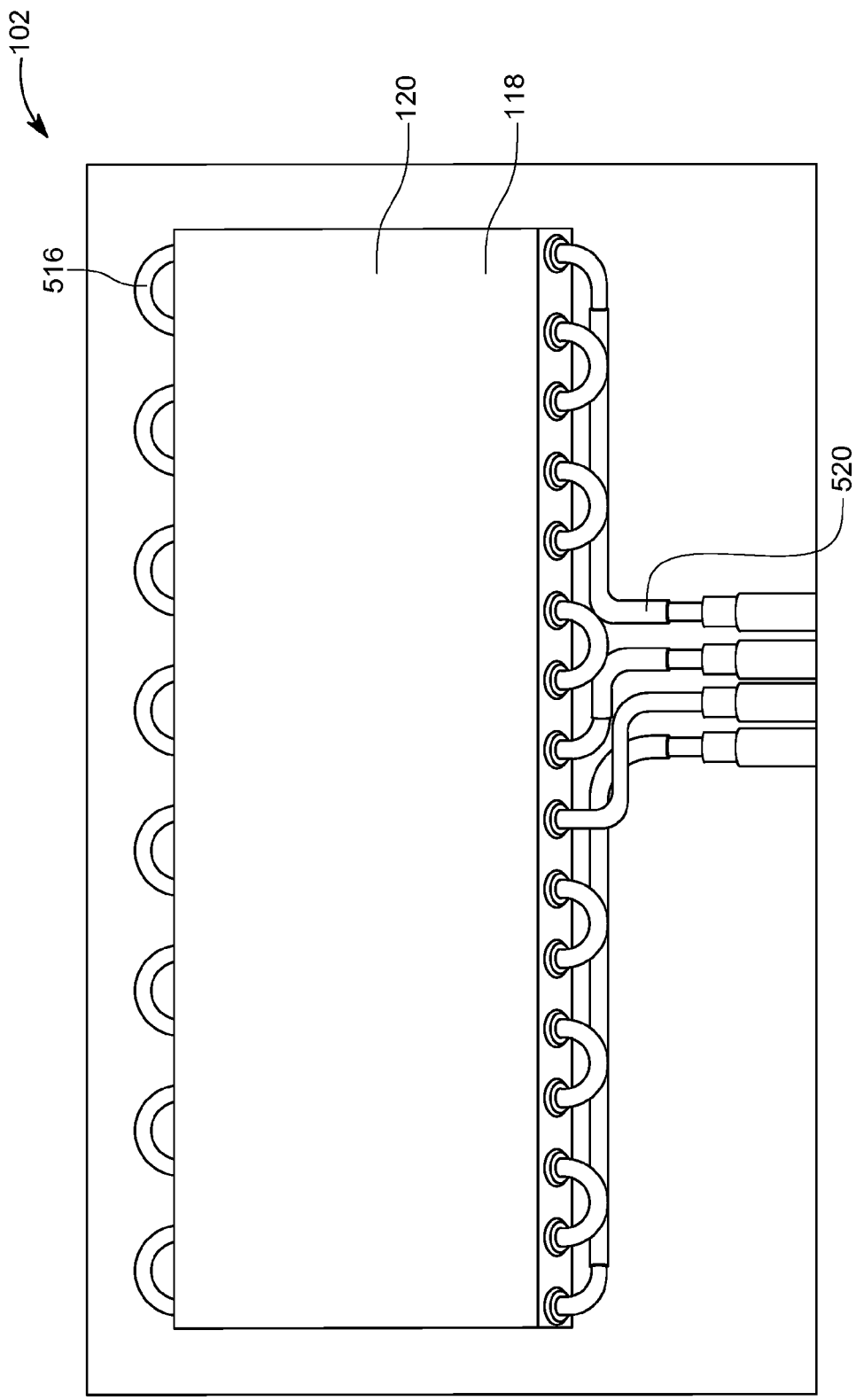
FIG. 5 shows a top perspective view of the conductive post-furnace heat station of the system for producing components by the hot stamping/hot forming procedure(s), wherein some portions of the conductive post-furnace heat station are not shown for sake of clarity and to better illustrate other portions of the conductive post-furnace heat station, in accordance with an embodiment of the present patent application.

In one embodiment, as shown in FIGS. 2 and 5, each of the lower platen 120 and the upper platen 118 includes a plurality of induction coils 516 therein. In one embodiment, the induction coils 516 are made of copper material. In one embodiment, the induction coils 516 are configured to heat the respective lower and upper platens 120 and 118. In one embodiment, the induction coils 516 are connected to an external power source. For example, as shown in FIG. 4, the induction coils 516 may have offset inductions leads 518. In one embodiment, the offset induction leads 518 are configured to prevent electrical coupling. In one embodiment, as shown in FIG. 5, the induction coils 516 are connected to a source of coolant (e.g., via connectors 520) located at the ends of the inductive coils 516. In one embodiment, the induction coils 516 are cooled by water.

In one embodiment, the induction coils 516 are used to provide energy into the platens 118 and 120 to heat the respective platens 118 and 120 and keep them at the desired temperature (i.e., a temperature above the AC3 temperature). In one embodiment, any source of heating may be used to heat and keep the platens 118 and 120 at the desired temperature (i.e., a temperature above the AC3 temperature) as long as it provides energy to the platens 118 and 120. For example, in one embodiment, the sources of heating, such as cartridge, open flame etc. may be used to provide energy/heat to the platens 118 and 120 and maintain the platens 118 and 120 at the desired temperature (i.e., a temperature above the AC3 temperature).

In one embodiment, the blank 108 is the work piece of which the portion 114 is configured to receive the heat energy from the platens 118 and 120. In one embodiment, the heated platens 118 and 120 are used to heat sheets for the purpose of hot stamping. In one embodiment, only portion 114 of the sheets or blanks 108 are heated in the conductive post-furnace heat station 102 through thermal conduction procedure.

In one embodiment, the upper platen 118 is constructed and arranged to provide pressure to the portion 114 of the heated blank 108H. In one embodiment, the upper platen 118 is heated to a desired platen temperature (i.e., higher than the AC3 temperature) and then moved into contact with the portion 114 of the heated blank 108H. In one embodiment, the lower platen 120 is constructed and arranged to be used as a base for the heated blank 108H to be placed on. In one embodiment, the lower platen 120 is also heated to a desired platen temperature (i.e., higher than the AC3 temperature). In one embodiment, either the upper platen 118 or the lower platen 120 is configured to apply contact pressure on the only the portion 114 of the heated blank 108H received in the conductive post-furnace heat station 102.

In one embodiment, either the upper platen or the lower platen 118, 120 is configured to apply contact pressure on only the portion 114 of the heated blank 108H received in the conductive post-furnace heat station 102. In one embodiment, each of the upper and lower platens 118, 120 are heated by at least one process selected from conduction, convection, resistance, induction, heat radiation and gas that are configured to provide energy to heat and maintain the respective upper and lower platens at the desired platen temperature. In one embodiment, the desired platen temperature is higher than the AC3 temperature. In one embodiment, the desired platen temperature of the upper platen 118 and/or the lower platen 120 is in the range between 727 and 1400° C.

Figure 6:
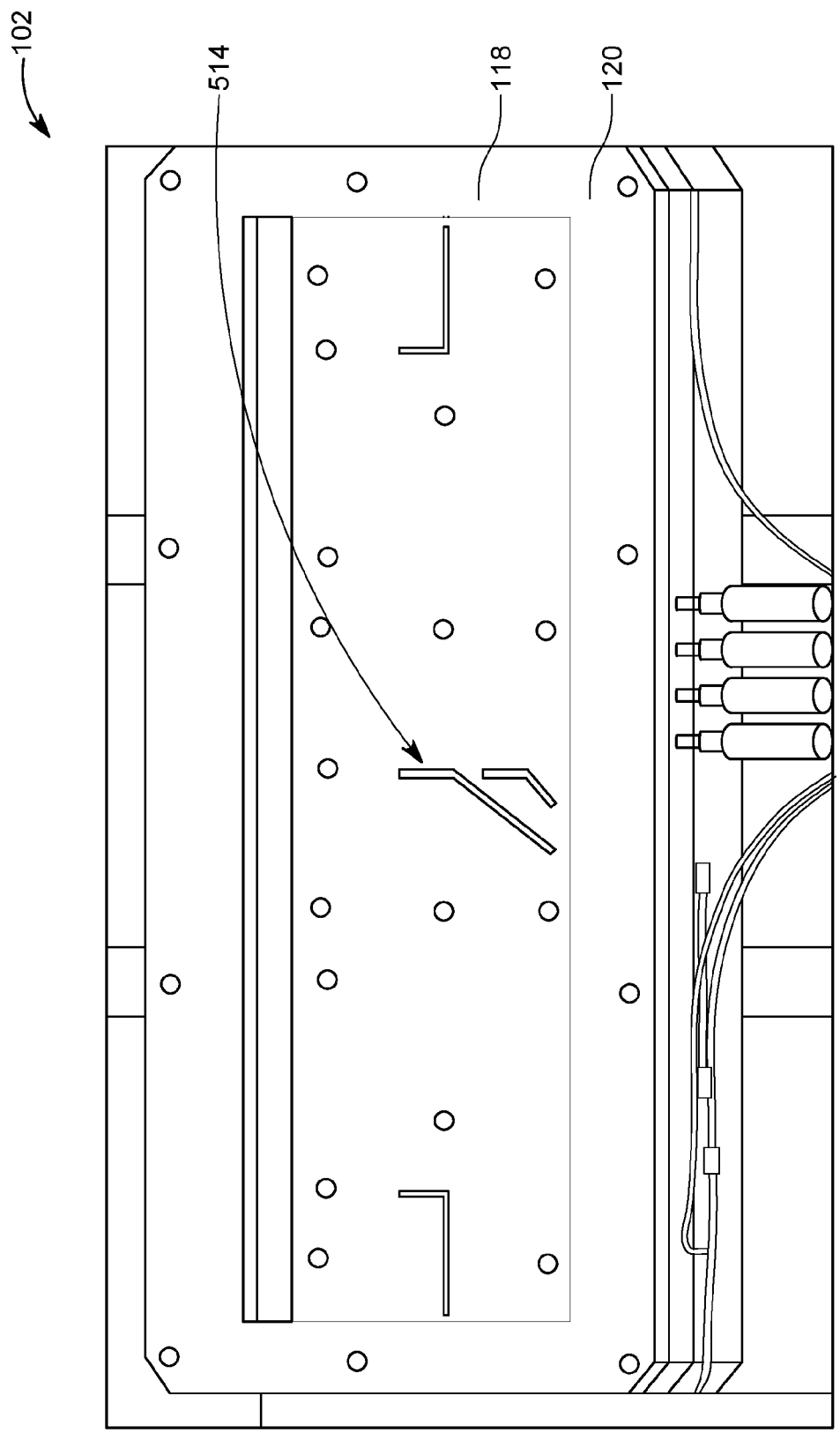
FIG. 6 shows another top perspective view of the conductive post-furnace heat station of the system for producing components by the hot stamping/hot forming procedure(s), wherein some portions of the conductive post-furnace heat station are not shown for sake of clarity and to better illustrate other portions of the conductive post-furnace heat station, in accordance with an embodiment of the present patent application.

In one embodiment, as shown in FIG. 6, each of the lower platen 120 and the upper platen 118 includes one or more sensors 514 therein. In one embodiment, the sensors 514 are configured to control and/or monitor the surface temperature of the respective lower and upper platens 120 and 118. In one embodiment, the one or more sensor 902 include sensors 514. In one embodiment, sensors 514, 902 include thermocouples or temperature sensors.

In one embodiment, the computer system 906 is configured to determine whether the portion 114 of the heated blank 108H, in the conductive post-furnace heat station 102, is above the AC3 temperature. In one embodiment, this may be determined either with sensors or the thermocouples 902, 514 associated with the conductive post-furnace heat station 102 or by monitoring the amount of time that each heated blank 108H remains in the conductive post-furnace heat station 102. In one embodiment, the computer system 906 is also configured to adjust the amount of time that the heated blank 108H is in the conductive post-furnace heat station 102. In one embodiment, the computer system 906 is configured to control the conductive post-furnace heat station 102 to heat the heated blank 108H to the temperature T2 (as shown in FIG. 8) that is in the range of 727 and 1400° C. and that is above AC3 temperature.

In one embodiment, the computer system 906 is also configured to adjust the surface temperatures of the lower and upper platens 120 and 118 based on the monitored surface temperature data/information of the lower and upper platens 120 and 118 obtained from the respective thermocouples or sensors 902, 514. In one embodiment, the computer system 906 is also configured to adjust the amount of time that the heated blank 108H is heated between the upper and lower platens 118 and 120. In one embodiment, surface temperatures of the lower and upper platens 120 and 118 can also be adjusted by the computer system 906 associated with the conductive post-furnace heat station 102.

Figure 11:
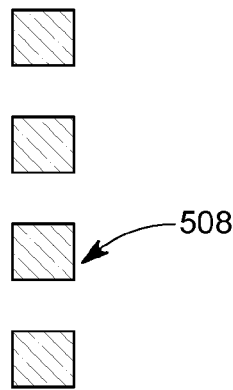
FIGS. 11 and 12 show cross-sectional and top views of support member, respectively in accordance with an embodiment of the present patent application.
Figure 12:
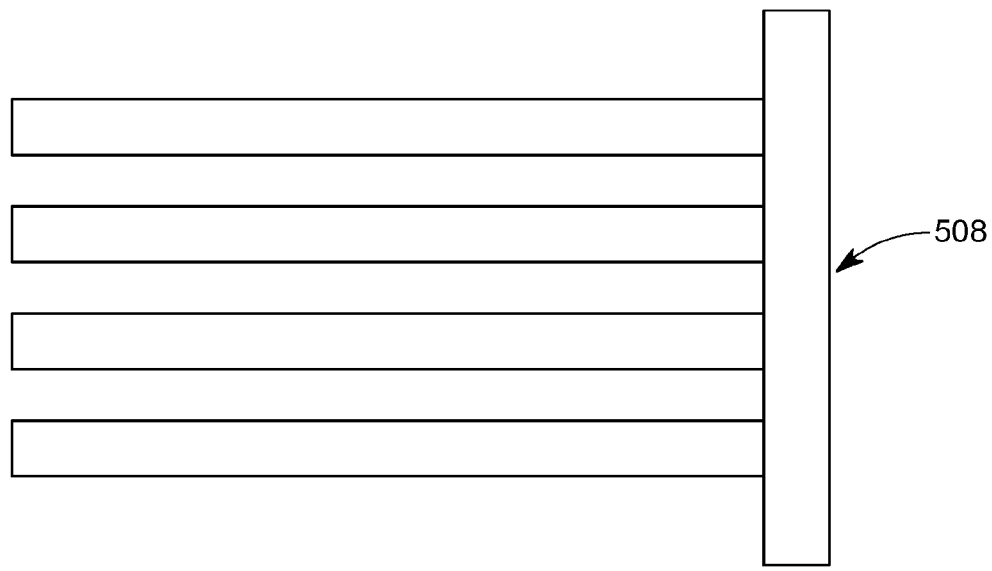

In one embodiment, the conductive post-furnace heat station 102 is configured to allow a portion 110 of the heated blank 108H that is not heated in the conductive post-furnace heat station 102 to extend out of the conductive post-furnace heat station 102. In one embodiment, the conductive post-furnace heat station 102 includes a support member 508 having a recessed portion 509 therein. In one embodiment, the support member 508 is configured to extend out of the conductive post-furnace heat station 102. In one embodiment, the recessed portion 509 of the support member 508 is configured to receive the portion 110 of the heated blank 108H that is not heated in the post-furnace heat station 102. In one embodiment, the support member 508 includes an unloading table. In one embodiment, the recessed portion 509 of the support member 508 is insulated from the surrounding environment, or includes a heater (not shown) so that the temperature of the portion 110 of the post-furnace conductive heated blank 108PH is maintained below the AC3 temperature when the post-furnace conductive heated blank 108PH enters the press 106. FIGS. 11 and 12 show cross-sectional and top views of support member 508, respectively in accordance with an embodiment of the present patent application.

In one embodiment, the robot 503 may be the second transfer station. In one embodiment, the second transfer station 503 is controlled by the computer system 906 and is configured to transfer the post-heated blank 108PH from the conductive post-furnace heat station 102 to the press 106.

In one embodiment, the system 100 includes the robot 503 that is constructed and arranged to lift the post-furnace conductive heated blank 108PH from the conductive post-furnace heat station 102 and place the post-furnace conductive heated blank 108PH in the press 106.

In another embodiment, the system 100 includes a blank feeder that is disposed between the conductive post-furnace heat station 102 and the press 106 and is operatively connected to both the conductive post-furnace heat station 102 and the press 106. In one embodiment, the blank feeder is constructed and arranged to convey the post-furnace conductive heated blank 108PH from the conductive post-furnace heat station 102 to the press 106. That is, the blank feeder is constructed and arranged to extend continuously from the conductive post-furnace heat station 102 to the press 106. In one embodiment, the blank feeder is an indexing blank feeder and includes a plurality of driven rollers. In one embodiment, the indexing feature of the blank feeder comprises a plurality of indexing fingers for aligning the post-furnace conductive heated blank 108PH in a predetermined position prior to entering the press 106. In one embodiment, the blank feeder is insulated from the surrounding environment, or includes a heater (not shown) so that the temperature of the portion 114 of the post-furnace conductive heated blank 108PH is maintained above the AC3 temperature when the post-furnace conductive heated blank 108PH enters the press 106 and the temperature of the rest 110 of the post-furnace conductive heated blank 108PH is maintained below the AC3 temperature when the post-furnace conductive heated blank 108PH enters the press 106.

In one embodiment, the press 106 includes a pair of dies 128 and 130. In one embodiment, the press 106 is constructed and arranged to stamp the post-furnace conductive heated blank 108PH between the pair of dies 128 and 130 to form the shaped part or component 208. That is, the post-furnace conductive heated blank 108PH (i.e., including portion 114 of the post-furnace conductive heated blank 108PH that is heated to a temperature T2 (as shown in FIG. 8) above the AC3 temperature in the conductive post-furnace heat station 102 and portion 110 of post-furnace conductive heated blank 108PH that is heated to a temperature T1 (as shown in FIG. 8) below the AC3 temperature in the furnace 104) is stamped between the pair of dies 128 and 130 to form the shaped part or component 208.

In one embodiment, at least one of the dies 128 and 130 is moveable. In one embodiment, the press 106 is operatively connected to the computer system 906. In one embodiment, the computer system 906 is configured to actuate the dies 128 and 130 (after the post-furnace conductive heated blank 108PH from the conductive post-furnace heat station 102 is properly placed between the dies 128 and 130 (e.g., by the robot/second transfer station 503)) such that the dies 128 and 130 are brought into contact with each other to form the shaped part or component 208 therebetween. For example, in one embodiment, the shaped parts or components 208 may include parts or components for use as chassis or body components of an automobile. In one embodiment, shaped parts or components 208 alternatively may be used in other applications.

In one embodiment, the press 106 is also constructed and arranged to quench the shaped part 208 between the dies 128 and 130. In one embodiment, the computer system 906 is also configured to adjust the amount of time that the parts 208 are quenched between the dies 128 and 130. In one embodiment, the hot forming procedures (i.e., heating in the furnace 104, conductive heating in the conductive post-furnace heat station 102, and shaping in the press 106) run continuously to produce a plurality of the shaped parts at a high rate and low cost.

In one embodiment, the system 100 includes the robot 504 that is constructed and arranged to lift the shaped components or parts 208 from the press 106 and place the shaped components or parts 208 in position on cooling racks 512. In one embodiment, the robot/transfer station 504 is operatively connected to the computer system 906. In one embodiment, the robot 504 may be referred to as a transfer station.

Figure 7:
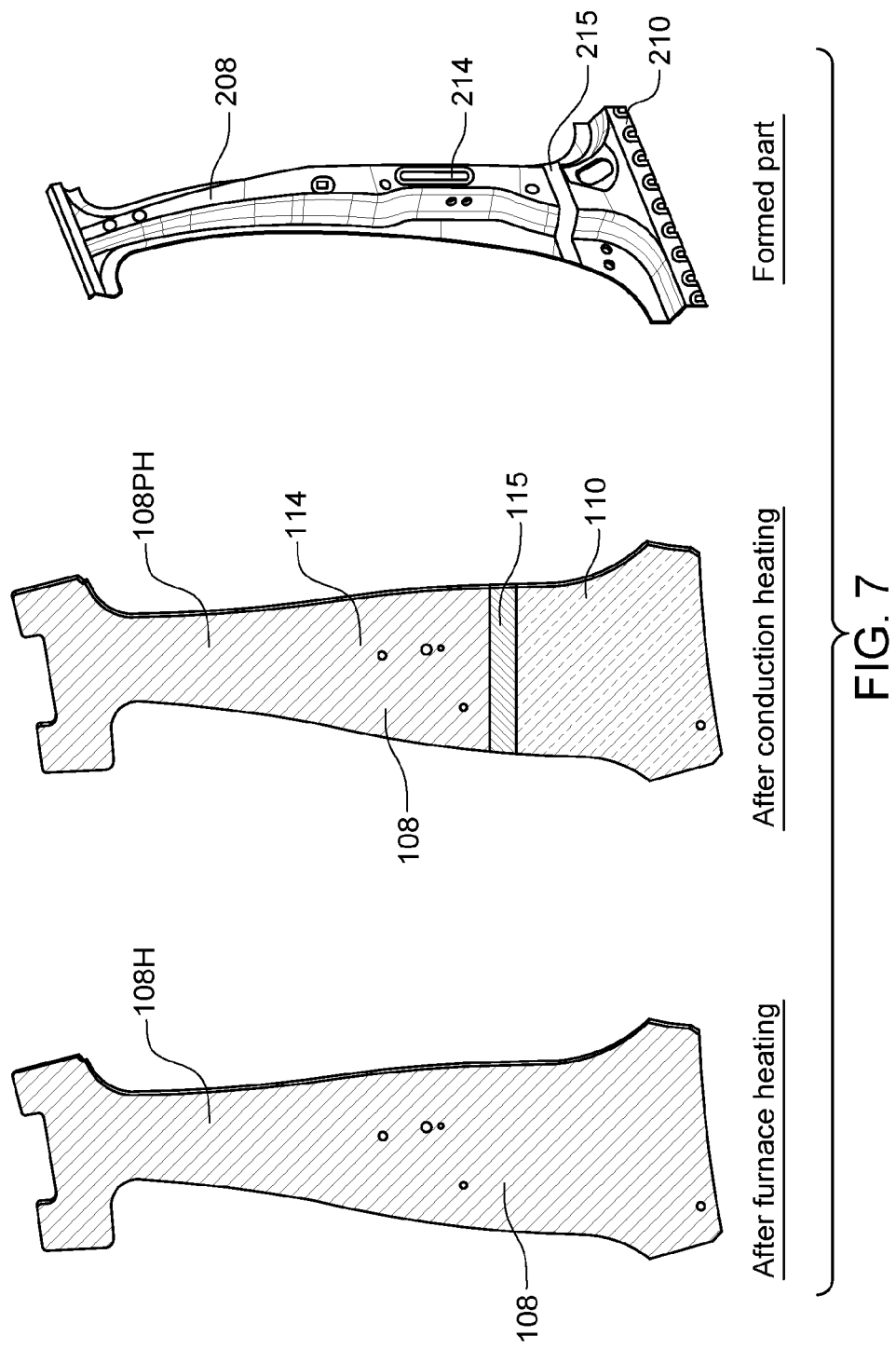
FIG. 7 shows an exemplary blank before and after passing through the conductive post-furnace heat station, and FIG. 7 also shows an exemplary component formed using the system of the present patent application.

In one embodiment, referring to FIG. 7, the component 208 formed by the system 100, using the hot forming procedures, may be interchangeably referred to as structural component. In one embodiment, the component 208 formed by the system 100, using the hot forming procedures, includes tailored material properties. In one embodiment, the component 208 formed by the system 100, using the hot forming procedures, includes tailored tempered properties. In one embodiment, the component 208 has tailored material properties because, though it is made of a single, monolithic piece, it has areas with increased hardness and areas with increased ductility.

In one embodiment, the component 208 formed by the system 100, using the hot forming procedures, includes a first portion 214 and a second portion 210. In one embodiment, the first portion 214 of the component 208 has an increased hardness relative to the second portion 210. In one embodiment, the second portion 210 of the component 208 has a reduced hardness relative to the first portion 214. In one embodiment, the second portion 210 of the component 208 has increased ductility compared to the first portion 214.

In one embodiment, only the portion 114 of the heated blank 108H (i.e., conductive heated in the conductive post-furnace heat station 102) forms the first portion 214 of the component 208. In one embodiment, the portion 110 of the heated blank 108H (i.e., not heated in the conductive post-furnace heat station 102) forms the second portion 210 of the component 208.

In one embodiment, the first portion 214 of the component 208 is referred to as a hard zone of the component 208. In one embodiment, the component 208 includes one or more first portions/hard zones. In one embodiment, the first portion 214 of the component includes martensitic microstructure.

In one embodiment, the second portion 210 of the component 208 is referred to as a soft zone of the component 208. In one embodiment, the component 208 includes one or more second portions/soft zones. In one embodiment, the second portion 210 of the component 208 includes at least one of tempered martensite, ferrite, pearlite, bainite, austenite, and cementite microstructure.

In one embodiment, the soft zone/second portion 210 is located in areas of the component 208 where increased ductility and/or reduced hardness is desirable. For example, in one embodiment, the soft zone/second portion 210 can be located in places of the component 208 where mechanical elements, such as self-piercing rivets or flow screws, are to penetrate the component, thereby allowing for easier penetration of the component 208. In one embodiment, the soft zone/second portion 210 can also be placed in areas of the component 208 that are subject to localized forces to reduce local stresses by absorbing energy and prevent, or at least reduce, the formation of cracks in those areas.

In one embodiment, the component 208 also includes one or more transition zones 215 between the first portion/hard zone 214 and the second portion/soft zone 210. In one embodiment, within the one or more transition zones 215, the ductility of the metal increases from the hard zone/first portion 214 to the respective soft zone/second portion 210, and the hardness increases from the respective soft zone/second portion 210 to the hard zone/first portion 214.

FIG. 8 shows a graphical representation of the various temperature profiles of the blank 108 heated using the system 100 of the present patent application, respectively. The temperatures (i.e., measured in ° C.) of the various portions of the blank 108 are shown on the left hand side Y-axis of the graph in FIG. 8 and the residence times of the various portions of the blank (i.e., measured in seconds) are on the X-axis of the graph FIGS. 8.

Referring to the graph of FIG. 8, in the system 100 of the present patent application, the entire blank 108 is heated in the furnace 104 a temperature T1 that is below AC3 temperature. In one embodiment, the entire blank 108 includes both portions 114, 115 and 110 (as shown in FIG. 7). In one embodiment, the temperature T1 is in the range of room temperature and 912° C. and that is below AC3 temperature.

Referring to the graph of FIGS. 7 and 8, in the system 100 of the present patent application, only the portion 114 of the heated blank 108H is heated in the conductive post-furnace heat station 102 by contact, thermal conduction heating to a temperature T2 above the AC3 temperature by thermal conduction. In one embodiment, the temperature T2 is in the range of 727 and 1400° C. and that is above AC3 temperature.

In one embodiment, the timings (i.e., furnace residence timing, conductive post-furnace heat station residence timing, etc.) of the present patent application shown in FIG. 8 are exemplary and are not construed to be limiting in anyway. In one embodiment, the timings (i.e., furnace resistance timing, conductive post-furnace heat station residence timing, etc.) may vary and depend on various factors, such as, thickness of the blank, geometry of the blank, furnace temperature, conductive post-furnace heat station temperature, contact pressure in both the furnace and/or conductive post-furnace heat station, etc. and any combination thereof.

Figure 9:
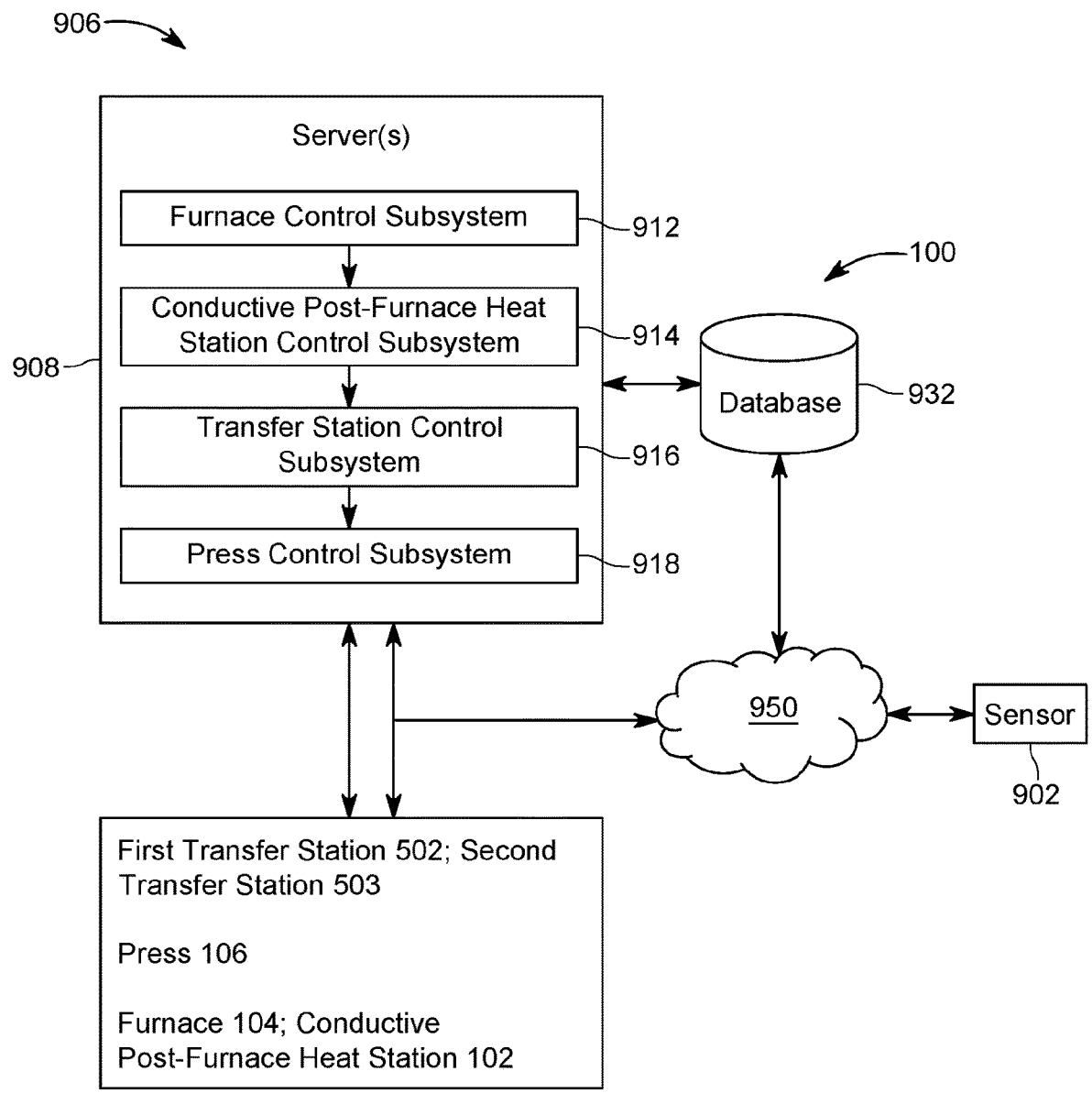
FIG. 9 shows an exemplary system for producing components by hot stamping or hot forming procedure(s) in accordance with an embodiment of the present patent application.

In one embodiment, referring to FIG. 9, sensor 902 includes a transmitter for sending signals/information and a receiver for receiving the signals/information. In one embodiment, sensor 902 is configured to communicate wirelessly with computer system 906. As shown in FIG. 9, in one embodiment, sensor 902 is configured to be operatively connected with computer system 906 and/or one or more physical processors 908 of computer system 906. In one embodiment, sensor 902 is configured to be operatively connected with the furnace 104, the conductive post-furnace heat station 102, the press 106, the transfer stations 500, 502, 503, 504, and/or other subsystems or components of the system 100. In one embodiment, sensor 902 is in communication with a database 932. In one embodiment, the information related to the temperature of the blank and other system parameters may be obtained from the database 132 that is being updated in real-time by sensor 902.

In one embodiment, the sensor 902 may include one or more sensors disposed in a plurality of locations, such as for example, coupled in a removable manner with the subsystems/components of the system 100, and/or in other locations.

In one scenario, a monitoring device may obtain information (e.g., based on information from sensor 902), and provide information to computer system 906 (e.g., comprising server 908) over a network (e.g., network 950) for processing. In another scenario, upon obtaining the information, the monitoring device may process the obtained information, and provide processed information to computer system 906 over a network (e.g., network 950). In yet another scenario, the monitoring device may automatically provide information (e.g., obtained or processed) to computer system 906 (e.g., comprising server 908).

In one embodiment, referring to FIGS. 1 and 9, the system 100 includes the computer system 906 that comprises one or more physical processors 908 operatively connected with the sensor(s) 902, the transfer stations 500, 502, 503, 504, the press 106, the furnace 104, and the conductive post-furnace heat station 102. In one embodiment, one or more physical processors 908 are programmed with computer program instructions which, when executed cause computer system 906 to perform various functions.

As shown in FIG. 9, system 100 may comprise the server 908 (or multiple servers 908). In one embodiment, the server 908 includes one or more physical/hardware processors 908. In FIG. 9, the database 932 is shown as a separate entity, but, in one embodiment, the database 932 could be part of the computer system 906. As will be clear from the discussions above and below, in one embodiment, the system 100 includes the computer system 906 that has one or more physical/hardware processors 908 programmed with computer program/machine readable instructions that, when executed cause computer system 906 to obtain temperature information/data from the sensor(s) 902.

In one embodiment, the server 908 comprises furnace control subsystem 912, conductive post-furnace heat station control subsystem 914, transfer station control subsystem 916, press control subsystem 918 or other components or subsystems. In one embodiment, the furnace control subsystem 912, the conductive post-furnace heat station control subsystem 914, the transfer station control subsystem 916, the press control subsystem 918 or other components or subsystems together may be referred to as signal processing or signal analysis device/unit.

In one embodiment, the furnace control subsystem 912 is configured to receive or obtain the temperature information of the furnace 104 from the sensor(s) 902. In one embodiment, the furnace control subsystem 912 is configured to receive or obtain the residence timing information of the furnace 104. In one embodiment, the furnace control subsystem 912 is configured to further process the received or obtained temperature and/or resident timing information. In one embodiment, based on the received/obtained information, the furnace control subsystem 912 is configured to control the furnace 104 to heat the blank to a temperature T1 (as shown in FIG. 8) that is below AC3 temperature. In one embodiment, this may be done either with sensors 902 associated with the furnace 104 or by monitoring the amount of time that each blank 108 remains in the furnace 104. In one embodiment, the furnace control subsystem 912 is also configured to adjust the amount of time that the blank 108 is in the furnace 104.

In one embodiment, the conductive post-furnace heat station control subsystem 914 is configured to receive or obtain the temperature information of the conductive post-furnace heat station 102 from the sensor(s) 514, 902. In one embodiment, the conductive post-furnace heat station control subsystem 914 is configured to receive or obtain the residence timing information of the conductive post-furnace heat station 102. In one embodiment, the conductive post-furnace heat station control subsystem 914 is configured to further process the received or obtained temperature and/or resident timing information. In one embodiment, based on the received/obtained information, the conductive post-furnace heat station control subsystem 914 is configured to control the conductive post-furnace heat station 102 to heat only a portion 114 of the heated blank 108H to a temperature T2 (as shown in FIG. 8) above the AC3 temperature by thermal conduction. In one embodiment, this may be done either with sensors 514, 902 associated with the conductive post-furnace heat station 102 or by monitoring the amount of time that each blank 108 remains in the conductive post-furnace heat station 102. In one embodiment, the conductive post-furnace heat station control subsystem 914 is also configured to adjust the amount of time that the blank 108 is in the conductive post-furnace heat station 102.

In one embodiment, the press control subsystem 918 is configured to receive or obtain information of the press 106 from the sensor(s) 902. In one embodiment, the press control subsystem 918 is configured to further process the received or obtained information. In one embodiment, based on the received/obtained information, the press control subsystem 918 is configured to control the press 106 to receive the post-heated blank 108PH from the post-furnace heat station 102, to form the post-heated blank 108PH into the shape of the component 208 and to quench the component 208 in the press 106.

In one embodiment, the transfer station control subsystem 916 is configured to receive or obtain information of the transfer stations 500, 502, 503, 504 from the sensor(s) 902. In one embodiment, the transfer station control subsystem 916 is configured to further process the received or obtained information. In one embodiment, based on the received/obtained information, the transfer station control subsystem 916 is configured to control the transfer stations 500, 502, 503, 504 to move the blank 108, 108H, 108PH through the system 100.

Figure 10:
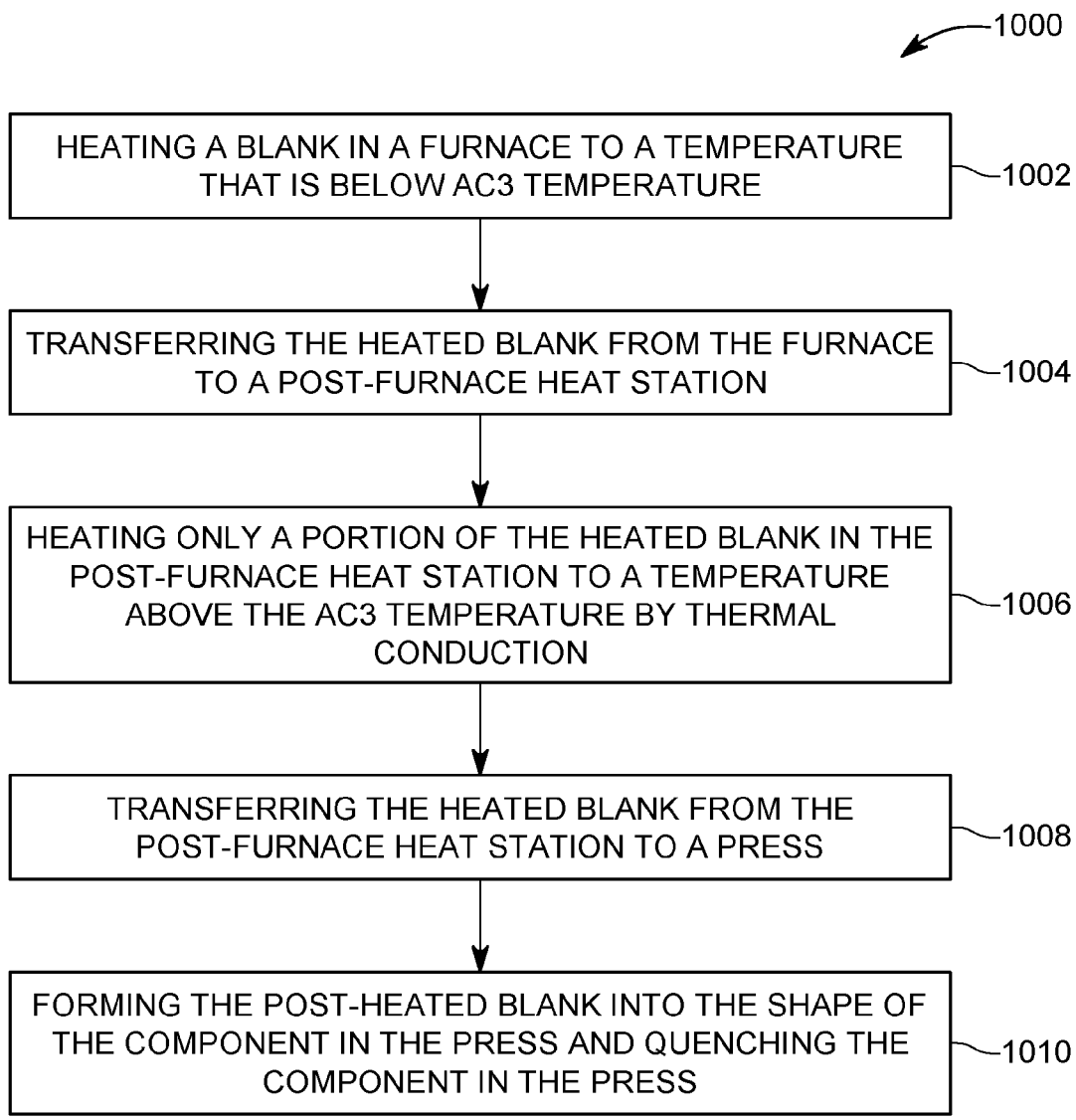
FIG. 10 shows an exemplary method for producing components by hot stamping or hot forming procedure(s) in accordance with an embodiment of the present patent application.

Referring to FIG. 10, a method 1000 for producing components 208 by hot forming is provided. The method 1000 is implemented by the computer system 906 that comprises the one or more physical/hardware processors 908 executing computer program/machine readable instructions that, when executed, perform the method 1000.

In one embodiment, the method 1000 comprises heating the blank 108 in a furnace 104 to a temperature T1 (as shown in FIG. 8) that is below AC3 temperature at procedure 1002; transferring the heated blank 108H from the furnace 104 to the conductive post-furnace heat station 102 at procedure 1004; heating the portion 114 of the heated blank 108H in the conductive post-furnace heat station 102 to a temperature T2 (as shown in FIG. 8) above the AC3 temperature by thermal conduction at procedure 1006; transferring the heated blank 108PH from the conductive post-furnace heat station 102 to the press 106 at procedure 1008; and forming the post-heated blank 108PH into the shape of the component 208 in the press 106 and quenching the component 208 in the press 106 at procedure 1010. In one embodiment, the temperature T1 (as shown in FIG. 8) that is below AC3 temperature is in the range between room temperature and 912° C. In one embodiment, the temperature T2 (as shown in FIG. 8) that is above AC3 temperature is in the range between 727 and 1400° C.

In one embodiment, the various computers and subsystems illustrated in FIG. 9 may comprise one or more computing devices that are programmed to perform the functions described herein. The computing devices may include one or more electronic storages (e.g., database 932, or other electronic storages), one or more physical processors programmed with one or more computer program instructions, and/or other components. The computing devices may include communication lines or ports to enable the exchange of information with a network (e.g., network 950) or other computing platforms via wired or wireless techniques (e.g., Ethernet, fiber optics, coaxial cable, WiFi, Bluetooth, near field communication, or other communication technologies). The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, or a digital circuit designed to process information, an analog circuit designed to process information, a state machine, and/or other mechanisms for electronically processing information. In one embodiment, the processors may include a plurality of processing units. These processing units may be physically located within the same device, or the processors may represent processing functionality of a plurality of devices operating in coordination. The processors may be programmed to execute computer program instructions to perform functions described herein of subsystems 912-918 or other subsystems. The processors may be programmed to execute computer program instructions by software; hardware; firmware; some combination of software, hardware, or firmware; and/or other mechanisms for configuring processing capabilities on the processors. In one embodiment, hardware processors may be interchangeably referred to as physical processors. In one embodiment, machine readable instructions may be interchangeably referred to as computer program instructions.

It should be appreciated that the description of the functionality provided by the different subsystems 912-918 described herein is for illustrative purposes, and is not intended to be limiting, as any of subsystems 912-918 may provide more or less functionality than is described. For example, one or more of subsystems 912-918 may be eliminated, and some or all of its functionality may be provided by other ones of subsystems 912-918. As another example, additional subsystems may be programmed to perform some or all of the functionality attributed herein to one of subsystems 912-918. It should be appreciated that the different subsystems 912-918 performing the operations illustrated in FIG. 9 may reside in a system with the sensor 902, the transfer stations 502, 503, the press 106, the furnace 104, and the conductive post-furnace heat station 102. In one embodiment, the different subsystems 912-918 performing the operations illustrated in FIG. 9 may reside in an independent monitoring device.

In one embodiment, the system 100 may include a user interface may be configured to provide an interface between the system 100 and a user through which the user can provide information to and receive information from system 100. This enables data, results, and/or instructions and any other communicable items, collectively referred to as "information," to be communicated between the user and the system 100. Examples of interface devices suitable for inclusion in user interface include a keypad, buttons, switches, a keyboard, knobs, levers, a display screen, a touch screen, speakers, a microphone, an indicator light, an audible alarm, and a printer. In one embodiment, information may be provided to the user by the user interface in the form of auditory signals, visual signals, tactile signals, and/or other sensory signals. It is to be understood that other communication techniques, either hard-wired or wireless, are also contemplated herein as the user interface. For example, in one embodiment, the user interface may be integrated with a removable storage interface provided by the electronic storage 932. In this example, information is loaded into the system 100 from removable storage (e.g., a smart card, a flash drive, a removable disk, etc.) that enables the user(s) to customize the system 100. Other exemplary input devices and techniques adapted for use with the system 100 as user interface include, but are not limited to, an RS-232 port, RF link, an IR link, modem (telephone, cable, Ethernet, internet or other). In short, any technique for communicating information with system 100 is contemplated as the user interface.

In one embodiment, the system 100 may also include a communication interface that is configured to send input/control signals to the furnace 104, the press 106, the transfer stations 502, 503, the conductive post-furnace heat station 102, and the transfer stations 502, 503 based on the temperature information or resident time information through an appropriate wireless communication method (e.g., Wi-Fi, Bluetooth, internet, etc.). In one embodiment, the system 400 may include a recursive tuning subsystem that is configured to recursively tune its intelligent decision making subsystem using available data or information to provide better overall adjustment of and/or better overall control of the furnace 104, the press 106, the transfer stations 502, 503, and the conductive post-furnace heat station 102. In one embodiment, intelligent decision making subsystem, communication interface and recursive tuning subsystem may be part of computer system 919 (comprising server 920).

In one embodiment, the system 100 is configured to form products having tailored tempered properties (TTP). For example, such products may include regions of reduced hardness, reduced strength and/or high ductility/yield/elongation in products. In one embodiment, the system 100 is configured to form vehicle body pillars, vehicle rockers, vehicle roof rails, vehicle bumpers and vehicle door intrusion beams. In another embodiment, the system 100 is configured to form customer required hot stamp structural components. In one embodiment, the hot formed member or component may be referred to as a hot stamped member or a hot shaped member. For example, hot stamping allows for the forming of complex part geometries with the final product achieving ultra-high strength material properties.

In one embodiment, the system 100 is configured to form crash components used in an automotive. In one embodiment, the crash components require tailored properties, for example, in strength and ductility to enhance the crashworthiness. In one embodiment, the system 100 is configured to form B-pillars, door transverse beams, side impact beams, A-pillars, hinge pillars, wheel houses, rear rails, front rails, and/or other impact crash components. As would be appreciated by one skilled in the art, the system and method could be employed to make a range of different automotive and non-automotive components including, for example, pillars, beams, bumpers, and rails.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A system for producing a component by hot forming, comprising:
    a furnace constructed and arranged to receive a blank, the blank having a first portion and a second portion,
    wherein the furnace is constructed and arranged to heat the first portion and the second portion of the received blank to a temperature that is below an AC3 temperature to provide a heated blank;
    a conductive post-furnace heat station constructed and arranged to receive therein the first portion of the heated blank from the furnace and to heat the first portion of the heated blank to a temperature above the AC3 temperature by thermal conduction to provide a post-heated blank,
    a computer system that comprises one or more physical processors operatively connected with the furnace and the conductive post-furnace heat station, the one or more physical processors being programmed with computer program instructions which, when executed cause the computer system to:
        control the furnace to heat the first portion and the second portion of the received blank to the temperature that is below the AC3 temperature, and
        control the conductive post-furnace heat station to heat the first portion of the heated blank to the temperature above the AC3 temperature by thermal conduction; and
    a press constructed and arranged to receive the post-heated blank from the conductive post-furnace heat station and to form the post-heated blank into the shape of the component,
    wherein the conductive post-furnace heat station includes a support member, wherein the support member is configured to extend out of the conductive post-furnace heat station, and
    wherein the support member is configured to support the second portion of the heated blank such that the second portion of the heated blank is positioned out of the conductive post-furnace heat station so that the second portion of the heated blank is not heated in the conductive post-furnace heat station.

2. A system for producing components by hot forming, comprising:
    a furnace constructed and arranged to receive a blank;
    a conductive post-furnace heat station constructed and arranged to receive a portion of the heated blank from the furnace;
    a computer system that comprises one or more physical processors operatively connected with the furnace and the conductive post-furnace heat station, the one or more physical processors being programmed with computer program instructions which, when executed cause the computer system to:
        control the furnace to heat the blank to a temperature that is below AC3 temperature, and
        control the conductive post-furnace heat station to heat the portion of the heated blank to a temperature above the AC3 temperature by thermal conduction; and
    a press constructed and arranged to receive the post-heated blank from the conductive post-furnace heat station and to form the post-heated blank into the shape of the component,
    wherein the conductive post-furnace heat station is configured to allow a portion of the heated blank that is not heated in the conductive post-furnace heat station to extend out of the conductive post-furnace heat station, and
    wherein the conductive post-furnace heat station includes a support member having a recessed portion therein, wherein the support member is configured to extend out of the conductive post-furnace heat station, and wherein the recessed portion of the support member is configured to receive the portion of the heated blank that is not heated in the conductive post-furnace heat station.

3. The system of claim 1, further comprising a first transfer station controlled by the computer system and configured to transfer the heated blank from the furnace to the conductive post-furnace heat station.

4. The system of claim 3, further comprising a second transfer station controlled by the computer system and configured to transfer the post-heated blank from the conductive post-furnace heat station to the press.

5. The system of claim 1, wherein the computer system is configured to control the furnace to heat the received blank to the temperature that is in the range of room temperature and 912° C. and that is below the AC3 temperature.

6. The system of claim 1, wherein the computer system is configured to control the conductive post-furnace heat station to heat the heated blank, by thermal conduction, to the temperature that is in the range of 727 and 1400° C. and that is above the AC3 temperature.

7. The system of claim 1, wherein the conductive post-furnace heat station includes an upper platen and a lower platen that are configured to cooperate to receive the first portion of the heated blank therebetween.

8. The system of claim 7, wherein either the upper platen or the lower platen is configured to apply contact pressure on only the first portion of the heated blank received in the conductive post-furnace heat station.

9. The system of claim 7, wherein each of the upper and lower platens are heated by at least one process selected from conduction, convection, resistance, induction, heat radiation and gas that are configured to provide energy to heat and maintain the respective upper and lower platens at a desired platen temperature.

10. The system of claim 7, wherein each of the upper and lower platens include thermocouples therein that are configured to monitor and control surface temperatures of the respective upper and lower platens.

11. The system of claim 1, wherein the press is constructed and arranged to quench the component in the press.

12. The system of claim 1, wherein the blank includes a longitudinal axis, and wherein the first portion and the second portion are disposed adjacent to each other along the longitudinal axis of the blank.

13. The system of claim 12, wherein the blank includes one or more transition portions that are disposed between the first portion and the second portion along the longitudinal axis of the blank.

14. The system of claim 1, wherein the computer system is configured to determine whether the first portion of the heated blank, in the conductive post-furnace heat station, is above the AC3 temperature using one or more sensors associated with the conductive post-furnace heat station or by monitoring the amount of time the heated blank remains in the conductive post-furnace heat station.

15. The system of claim 14, wherein the computer system is configured to adjust the amount of time that the heated blank is heated in the conductive post-furnace heat station.

16. The system of claim 14, wherein the conductive post-furnace heat station includes the one or more sensors therein,
wherein the one or more sensors are configured to monitor surface temperatures in the conductive post-furnace heat station, and
wherein the computer system is configured to adjust the surface temperatures in the conductive post-furnace heat station based on monitored surface temperature data/information in the conductive post-furnace heat station obtained from the one or more sensors.

17. The system of claim 16, wherein the one or more sensors include temperature sensors or thermocouples.

18. The system of claim 1, wherein the conductive post-furnace heat station includes one or more sensors, a lower platen, and an upper platen, and
wherein the one or more sensors are configured to monitor surface temperatures of the lower platen and the upper platen of the conductive post-furnace heat station.

19. The system of claim 18, wherein the one or more sensors include temperature sensors or thermocouples.

20. The system of claim 19, wherein the computer system is (Previously Presented) configured to adjust the surface temperatures of the lower and upper platens of the conductive post-furnace heat station based on monitored surface temperature data/information of the lower and upper platens obtained from the one or more sensors.

* * * * *